United States Patent [19]
Plegat

[11] 3,921,436
[45] Nov. 25, 1975

[54] METHOD FOR CHECKING TIGHTNESS OF HOLLOW BODIES AND MORE PARTICULARLY OF HEAT EXCHANGERS, AND DEVICE FOR EMBODYING SAID METHOD

[75] Inventor: Alain Edouard Plegat, Asnieres, France

[73] Assignee: Societe Anonyme des Usines Chausson, Asnieres, France

[22] Filed: Apr. 17, 1974

[21] Appl. No.: 461,581

[30] Foreign Application Priority Data
May 10, 1973 France .......................... 73.16958

[52] U.S. Cl. .................................... 73/40; 73/49.2
[51] Int. Cl.[2] ........................................ G01N 3/02
[58] Field of Search ............. 73/40, 40.5, 49.1–49.5

[56] References Cited
UNITED STATES PATENTS

| | | |
|---|---|---|
| 3,074,265 | 1/1963 | Symons .................................. 73/49.2 |
| 3,209,596 | 10/1965 | Kelly ..................................... 73/40 X |
| 3,221,539 | 12/1965 | Evans et al. ....................... 73/49.2 X |
| 3,316,753 | 5/1967 | Herren ................................. 73/49.1 |

*Primary Examiner*—Richard E. Aegerter
*Assistant Examiner*—Charles E. Phillips
*Attorney, Agent, or Firm*—Flynn & Frishauf

[57] ABSTRACT

For checking the good tightness of a hollow body, a similar hollow body is used, all the apertures of the two hollow bodies are closed but one and the last aperture of said hollow bodies is connected to a source of compressed gas through a valve which then isolates said hollow bodies from the source when they are filled with compressed gas and puts them in communication with the two inlets of a differential manometer whose deviation shows the eventual leaks of the hollow body under test.

7 Claims, 4 Drawing Figures

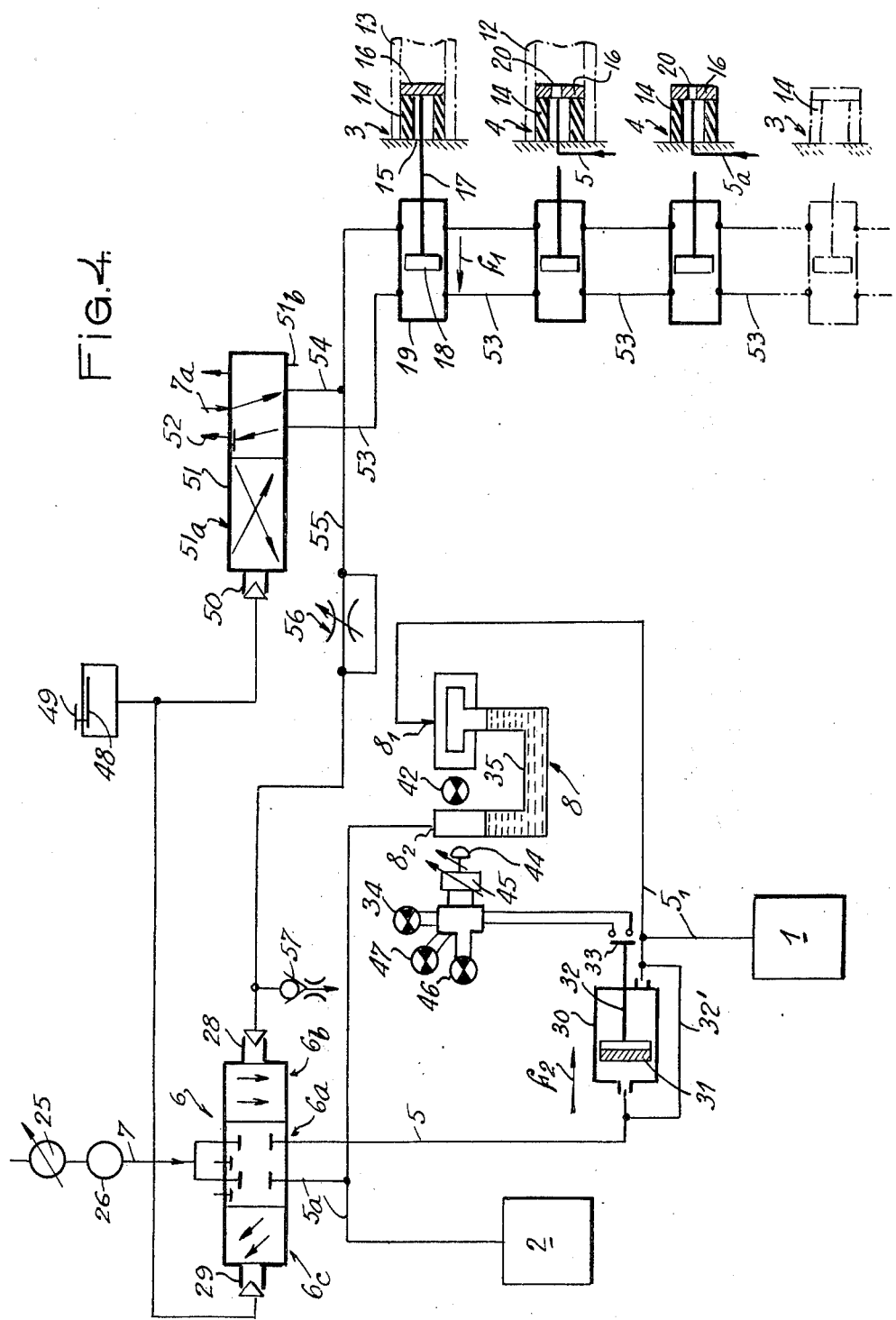

METHOD FOR CHECKING TIGHTNESS OF HOLLOW BODIES AND MORE PARTICULARLY OF HEAT EXCHANGERS, AND DEVICE FOR EMBODYING SAID METHOD

The present invention relates to a new method for checking tightness of hollow bodies, and relates, more particularly, to the checking of heat exchangers, typically heating and cooling apparatuses of the type used in motor vehicles.

In already known methods, the tightness is checked by subjecting the exchangers to an internal over pressure air and in immersing the exchangers under water. Any leaks are detected by the bubbing action of the air escaping from the exchangers.

This procedure is time consuming and not very accurate. In fact, small leaks are not easily detected. Besides it is frequent that some air, retained by surface tension on the outer portion of the exchanger, causes the forming of bubbles which thus can be interpreted as being leaks.

Furthermore, after the test the apparatuses have to be dried, which, upon the manufacturing process, is a long and inevitably costly operation.

The new method according to the invention avoids the above described disadvantage by making possible to test the apparatuses with a very great accuracy in a very short period of time and without any requirement to dry the apparatuses.

According to the invention, the method for checking tightness of hollow bodies and more particularly heat exchangers, is characterized by positioning close to each other, a reference hollow body known as having a good tightness and a substantially similar hollow body to be tested, said hollow bodies having apertures for communication with the outside, closing all the apertures of the two hollow bodies except one on each of them which is let free, sending compressed air simultaneously and through substantially identical pipes through the free aperture in said hollow bodies from a source of compressed gas, isolating simultaneously said hollow bodies from the source of compressed gas while respectively connecting them simultaneously to two inlets of a differential manometer during a significant period of time.

The invention also relates to a device for embodying the above described method, said device making possible a performance of the test without any risk of error in the operational sequence of the method and while being ensured that the apparatuses cannot be considered as being tight whatever can be the possible operational incidents which can eventually occur. In fact, according to this device, any operational incident can only lead to consider as being bad an apparatus having been tested.

According to the second arrangement of the invention, the device comprises a support for a reference hollow body and for a hollow body having to be tested, both said hollow bodies being of a similar type, a first set of caps for closing all the apertures but one of each of said two hollow bodies, a second set of caps for closing the last aperture of each of the two hollow bodies and to bring testing compressed air therein, said second set of caps being connected to a common distributing valve having three positions, a first position for which the two hollow bodies are isolated from a source of compressed air, an operational position for which compressed air is supplied to the two hollow bodies and a third position for evacuating the two hollow bodies, ducts connecting the distributing valve to said two hollow bodies also communicating with the two inlets of a two inlet differential manometer.

Various other features of the invention are revealed from the following detailed description.

An embodiment of the invention is shown, by way of non-restrictive example, in the accompanying drawings, wherein:

FIG. 4 is an explaining diagram of how works the machine.

Figure 1:
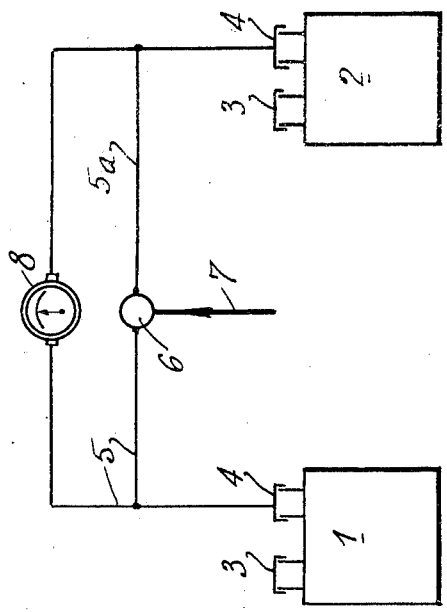
FIG. 1 is a view diagrammatically showing how a process for checking tightness of hollow bodies is embodied according to the invention.

The method of the invention is generally shown in FIG. 1 in its preferred application to checking tightness of heat exchangers, for example radiators for heating the inside of vehicles. According to this method, a first heat exchanger 1 is used of which the tightness has already being proofed. This heat exchanger is selected as being similar and preferably identical to the heat exchanger 2 which is to be tested. It is in fact important, according to the invention, that the inner volume of both the reference heat exchanger and that to be tested be similar as well as their shape.

Additional care must be taken to check that the reference heat exchanger and the heat exchanger to be tested be substantially at a same temperature and be placed as close as possible to each other to prevent any chance of a change in their temperature during the test. Then, all the apertures of the two heat exchangers are closed with seal tight caps 3 except that one aperture is remaining free for each of the two heat exchangers distributing caps 4 are placed on the free aperture ensuring a tight closing of said aperture, but enabling to simultaneously connect the reference heat exchanger and the heat exchanger to be tested to ducts 5, 5a connected both through a same valve 6 to an intake duct 7 of compressed gas, while the ducts 5, 5a are also directly connected to a differential manometer 8.

The method for performing the test is as follows:

The valve 6 is open, thus a compressed gas is supplied simultaneously into the reference heat exchanger and into the heat exchanger to be tested. Then the valve 6 is closed to isolate the two heat exchangers from the intake duct 7 of compressed gas. The heat exchangers are left in that state for a period of time from $t$ which can be for a period of a few seconds to one minute. During that time the differential manometer 8 is submitted, on each of its two inlets, to pressures being respectively that in the reference heat exchanger 1 and that in the heat exchanger 2 to be tested. At the end of the test, the deviation of the differential manometer 8 is considered to determine if the pressure in the heat exchanger 2 to be tested has not dropped down to a predetermined value with respect to the pressure in the standard exchanger 1.

If the pressure in the heat exchanger 2 to be tested remains sufficient, then the heat exchanger is considered as being "good" and it is substituted by another heat exchanger to be tested.

Figure 3:
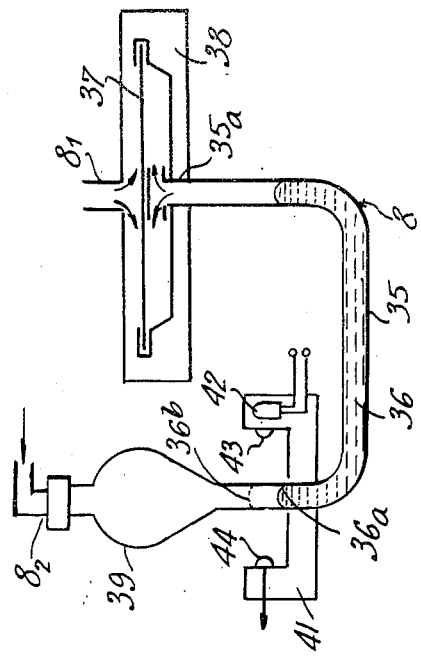
FIG. 3 is a diagram of one of the components of the machine.
Figure 2:
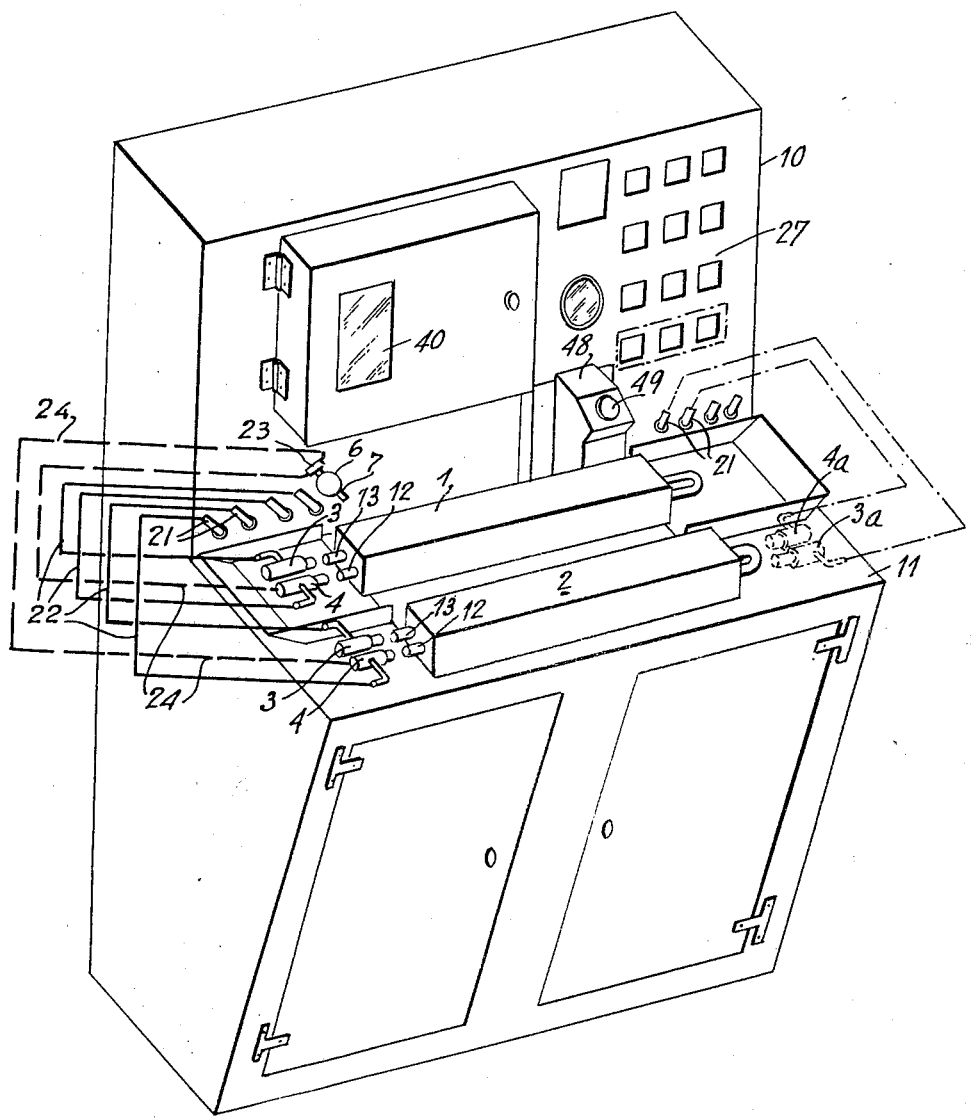
FIG. 2 is a perspective view of a testing machine according to the invention.

FIGS. 2 to 4 show a device for embodying the above described method. Said device comprises a cabinet 10 delimiting a table 11 whereupon are placed the reference heat exchanger 1 and the exchanger 2 to be tested. The table also supports the caps 3 and 4 which, in the example represented, are only on one side of said table 11 because the heat exchangers 1, 2 which are shown are each provided with only one U-shaped tube of which the ends 12, 13 are both placed on a same side of the heat exchangers.

When the device must enable to test heat exchangers having apertures on both sides, there can be designed a second set of caps, as shown in mixed lines by 3a, 4a, on the right side of the table.

The caps 3 and 4 can be made in many different ways, but they are preferably entirely automatically remotely controlled. In FIG. 4, in the right portion thereof, it can be noticed that the caps 3 advantageously comprise a casing or other distortable fitting 14 held between a fixed stop 15 and a pressure plate 16 to which is connected a rod 17 of a piston 18 placed inside a cylinder 19 which, in the example shown, is of the two-effect type. When the piston 18 is moved according to the arrow $f_1$, then the fitting 14 is compressed and closes the ends 12 or 13 of the heat exchanger tube in which said fitting is engaged.

As to the caps 4 which are designed to supply the testing compressed gas, their pressure plate 16 is bored with a hole 20 from where emerge the ducts 5, and 5a, for the intake of the testing compressed gas.

In FIG. 2, the closing caps 3 are connected to distributing ends 21 by flexible ducts 22 while the caps 4 used for a simultaneous intake of the testing compressed gas are connected to distributing ends 23 by flexible ducts 24 constituting the ducts 5, 5a of FIG. 1. All the flexible ducts 24 at least must be of a same length to have no influence during the test. Besides, the lengths of the flexible ducts, both 22 and 24, are advantageously selected to enable the device to be used for testing heat exchangers of very different shapes and sizes without having to modify the apparatus.

The valve 6 is also diagrammatically shown in FIG. 2 as well as the duct 7 for the intake of the testing compressed gas.

FIG. 4 shows that the duct 7 is supplied from an adjustable pressure-reducer 25, downstream of which is advantageously placed a manometer 26 provided for checking at any moment the pressure of the testing gas. The information given by the manometer 26 and also that from other possible check elements are shown on a panel diagrammatically illustrated at 27 in FIG. 2.

The above described valve 6 is preferably constituted of a distributor having three positions 6a, 6b, 6c, the position 6a being the neutral position to which the distributor is normally automatically brought back and in which the reference heat exchanger 1 and the heat exchanger 2 to be tested are isolated from the intake duct 7 of the testing compressed gas; the position 6b is the position to which the testing compressed gas is brought to the two heat exchangers 1 and 2, and the position 6c is the draining off position for evacuating the gas from the heat exchangers.

The bringing of the distributor in one or another of the working positions 6b and 6c is controlled through relays 28, 29.

As better shown in FIG. 4, the duct 5 of FIG. 1 is not directly connected to the reference heat exchanger 1, but through a cylinder 30 in which is placed a piston 31 having a rod 32 controlling a switch 33. The outlet of the cylinder 30 is connected through a duct $5_1$ both to the reference heat exchanger 1 and to one of the inlets $8_1$ of the differential manometer 8.

A by-pass duct 32 providing an important loss of pressure shunts the cylinder 30.

It can be noted from the above disclosure that the testing compressed gas supplied through the duct 5 causes the sliding of piston 31, in direction of arrow $f_2$, this motion being made possible due to the presence of the by-pass duct 32. The sliding of piston 31 takes place up to the moment when it closes the switch 33, which closing position of said switch being connected to a checking circuit in the form of a a signal-lamp 34 placed on the panel 27.

At the end of the stroke of piston 31 it is ensured that the pressure is the same on both sides of piston 31 since said pressure is equalized by the by-pass duct 32. Consequently it can be ensured that the reference heat exchanger 1 is really put under pressure at the same time as the heat exchanger 2 to be tested which is fed in testing compressed gas through the duct $5a$; said duct being also connected to the other intake $8_2$ of the differential manometer 8.

To obtain a great accuracy in the performance of the test, it is advantageous to realize the differential manometer 8 as illustrated in FIG. 3 which shows that this manometer comprises a translucent tube 35 folded like a U and in which has been placed a liquid 36 which can be tinted.

The end 35a of the tube 35 FIG. 3 emerges in a deformable diaphragm case 37 positioned in a chamber 38 wherein is placed the inlet $8_1$ of the manometer. On the other side, the tube 35 is extended by a bulb 39 connected by its upper portion to the second inlet $8_2$ of the manometer.

Preferably, the manometer is provided to be seen by an operator and is placed behind an aperture 40 of the panel 27.

The volumes of the deformable case 37 and of the bulb 39 are so selected to contain the totality of the liquid 36 in view of preventing any damage to the manometer if for any reason there is an important difference in pressure between that of the inlets $8_1$ and $8_2$, as it could happen for example if one of the caps 3 or 4 were wrongly placed.

A level detector 41 is designed along one of the upwards arms of tube 35, this level detector comprising a light source 42 focussed through optical means 43 on said upwards arm of the tube 35 on the other side of which is placed a photoelectric cell 44 connected, as shown in FIG. 4, to an amplifier 45 at the outlet of which is placed at least one warning device 46 which can be constituted of a signal lamp, a buzzer, etc.

The operation of the light source 42, of the photoelectric cell and of the amplifier 45 is checked at any moment by another warning device 47, for example a signal lamp, which can be visualized on the panel 27 and which may be of a color advantageously different from that of the warning device 46, when the latter is also a signal lamp.

To ensure an automatic operation of the device and enable the processes to be embodied with a minimum manual intervention, there is provided a control component 48 FIG. 4, for example a time-switch operated from a push-button 49, output of the time-switch being connected to the relay 29 of the distributor 6 and to a relay 50 of a second distributor 51 with two positions, i.e., a first position 51a for draining off and a second position 51b for working. The distributor 51 is connected to an intake of compressed gas 7a which can be different from the intake of compressed gas 7, especially if it is desired, in view of controlling the cylinders 19, to use air charged with lubricant, while on the contrary the testing gas generally must be free of any impurity and of all products which could contaminate the inside of the heat exchangers.

The distributor 51 is also connected to a draining off duct 52.

One of the outlets of the distributor 51 is connected by a duct 53 to the different cylinders 19 on the one side of piston 18 for which the rod 17 tends to release the deformable fitting 14. The other outlet 54 of the distributor 51 is also connected to the different cylinders 19 but on the other side of piston 18, and said outlet is also connected by means of a duct 55 to the relay 28 controlling the distributor 6.

On the duct 55 there are designed, on one hand and in series, a first delaying device 56 and, on the other hand, in shunt, a second delaying device 57 placed between the device 56 and the relay 28.

The time spent for holding in working position the time-switch 48 is equal to the period of time for one cycle.

In a first step, the time-switch 48 brings the distributor 51 in a first working position as shown. Consequently, the compressed gas brought by the duct 7a is introduced into the cylinders 19 to push back the pistons 18 according to direction of the arrow $f_1$, thus the filting 14 of the caps 3, 4 previously placed in the outlet apertures of the heat exchangers are inflated.

The compressed gas coming from the duct 7a is also brought through the duct 54 and the duct 55 to the delaying device 56 which lets said gas pass only a moment after the inflating of the closing caps. After this delay period the compressed gas operates the relay 28 which brings the distributor 6 in its working position 6b. In this position, the compressed gas coming from the duct 7 is brought to the reference heat exchanger 1 and to the heat exchanger 2 to be tested in the manner explained in the above disclosure.

After a new period of time, the delaying device 27 is open to release the relay 28; consequently, the distributor 6 comes back to its neutral position 6a which is the position shown in FIG. 4 for which the reference heat exchanger 1 and the heat exchanger 2 to be tested are isolated from the intake circuit of compressed gas and connected only to the differential manometer 8. These successive steps are visualized by signal lights provided on the panel 27.

If the pressure in the heat exchanger 2 to be tested, does not significantly drop, then the liquid does not reach the level of the light ray focalized on the tube 35 by the optical device 43 of FIG. 3. On the contrary, if the pressure drops in the heat exchanger 2, the liquid 36 raises from the position 36a, for example, up to the position 36b and consequently intercept the light ray. Then this liquid acts as an optical diffuser and the photoelectric cell 44 receives a different information which is amplified by the amplifier 45 to operate the warning signal 46 showing that the heat exchanger is not tight.

At the end of the cycle, the time-switch 48 sends a new pulse which is applied to the relay 29 which consequently brings the distributor 6 in its draining position 6c. Thus the reference heat exchanger 1 and the heat exchanger 2 to be tested are drained of their testing compressed air. In the end, the time-switch 48 comes to a stop, then the distributor 6 returns to its neutral position 6a while the distributor 51 comes to the second working position 51a for which some compressed air is supplied through the duct 53 to release the caps 3 and 4 by moving the piston 18 of each cap in a direction opposite to that of arrow $f_1$.

The diagram of FIG. 4 which has just been described in the above disclosure is, of course, only an example. The various distributors, delaying devices and other similar elements can be replaced by their technical equivalents. Selection been made by the skilled man after consideration of the material elements he requires, which can be only compressed-air elements or a combination of compressed-air and electrical elements, or also, compressed-air, electrical and hydraulic elements. The delaying functions, of course, can also be obtained through different ways.

The invention is not restricted to the embodiment shown and described in detail, for various modifications thereof can moreover be applied thereto without departing from the scope of the invention as shown in the appended claims.

I claim:

1. A device for checking tightness of hollow bodies, wherein a hollow body to be tested is compared to a substantially identical reference hollow body, said device comprising a support for the reference hollow body and for the hollow body to be tested, a first set of caps for closing all apertures but one of each of the two hollow bodies whereby one aperture is free, a second set of caps for connection of the free aperture of each of said two hollow bodies to a common distributing valve with three positions, a first position for which the two hollow bodies are simultaneously connected to a source of compressed gas to bring a testing compressed gas into said two hollow bodies, a second position for which the two hollow bodies are simultaneously isolated from the source of compressed gas, and a third position for which the two hollow bodies are drained off of the testing compressed gas, each cap of the second set of caps being further connected to an inlet of a differential manometer through a pair of substantially identical pipes; further comprising an air-cylinder and a duct wherein the distribution valve is connected to the free aperture of the reference hollow body through said air-cylinder, said air-cylinder being shunted by said duct, thus producing a loss of pressure in said cylinder, said air-cylinder containing a piston freely mounted therein, a switch being controlled by this piston, said switch having a closing position connecting a voltage source to a checking circuit, to check that the testing gas is really applied inside said reference hollow body.

2. Device as set forth in claim 1, wherein the distributing valve is controlled from at least one second valve for controlling at least one series of caps closing the apertures of the hollow bodies and through which the testing compressed gas is supplied.

3. Device as set forth in claim 2, wherein the caps comprise a distortable fitting introduced in said apertures of the hollow bodies, said fitting being distorted by a pressure plate controlled by a piston placed in a controlling cylinder operated through the second valve.

4. Device as set forth in claim 2, wherein at least one delaying circuit is placed between the distributing valve and the second valve, whereby intake of compressed gas in the reference hollow body and in the hollow body to be tested is delayed with respect to the intake of compressed gas causing operation of the cylinders controlling the selfclosing caps.

5. Device as set forth in claim 3, wherein the differential manometer comprises a U-shaped tube partly filled with a liquid, one end of said tube being connected to a distortable diaphragm case placed within a chamber in which is applied the pressure of the testing compressed gas in the reference hollow body, other end of said tube being connected to a bulb in which is applied the pressure of the testing compressed gas of the hollow body to be tested, and a device with a photoelectric cell being placed in front of an arm of the U-shaped tube to detect a threshold of motion of the liquid during a significant period of time when the two hollow bodies having being filled with compressed gas are isolated from the source of compressed gas.

6. Device as set forth in claim 5, wherein both the distortable case and the bulb of the differential manometer have a volume at least equal to that of the liquid contained in the U-shaped tube.

7. Device as set forth in claim 2, wherein the distributing valve is fed with dry air while the second valve is fed with air charged with lubricant.

* * * * *